J. F. HELLER.
SOCKET JOINT.
APPLICATION FILED FEB. 5, 1915.
1,154,309.
Patented Sept. 21, 1915.
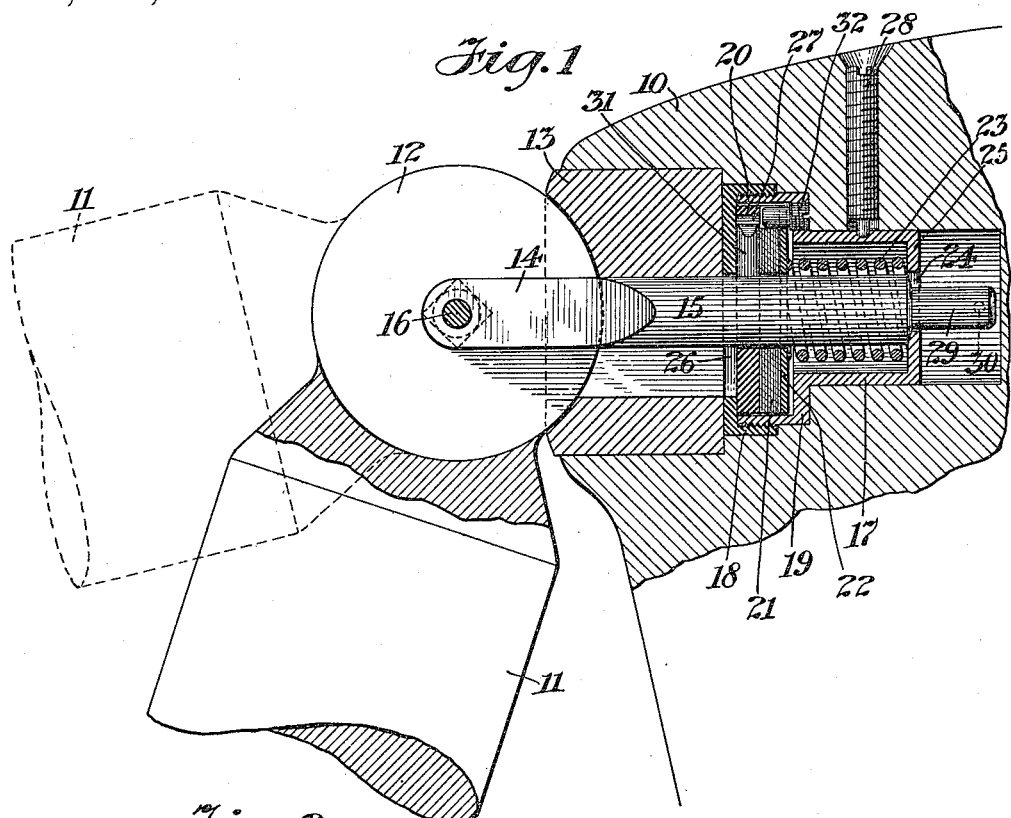
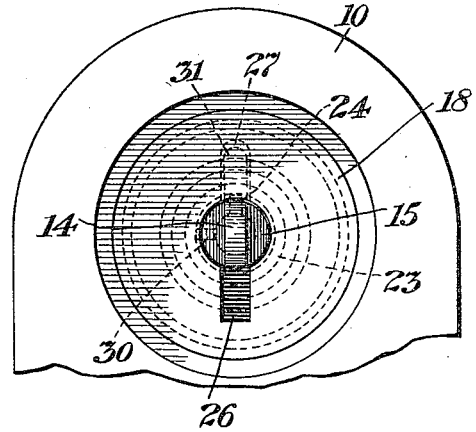
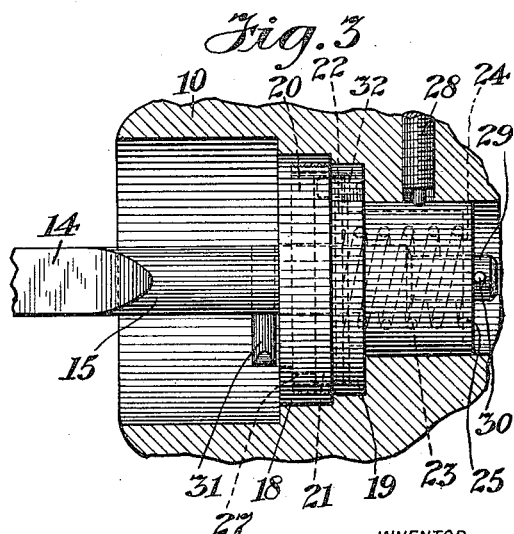
WITNESSES
Chas. F. Clagett
Bertha M. Alle
INVENTOR
Joseph F. Heller
BY
HIS ATTORNEYS

UNITED STATES PATENT OFFICE.

JOSEPH F. HELLER, OF WOODHAVEN, NEW YORK.

SOCKET-JOINT.

1,154,309.    Specification of Letters Patent.    Patented Sept. 21, 1915.

Application filed February 5, 1915. Serial No. 6,214.

*To all whom it may concern:*

Be it known that I, JOSEPH F. HELLER, a citizen of the United States, residing at Woodhaven, in the borough of Queens, city and State of New York, have invented an Improvement in Socket-Joints, of which the following is a specification.

My present invention relates to socket joints, particularly applicable for securing the limbs in position in models, figures, and other forms.

Heretofore, so far as I am aware, in securing the limbs, and particularly the arms, to the body portion of forms or models, it has been customary to permanently secure the parts relatively to one another in such a manner that while the arms may be moved in the sockets they cannot be separated from the body portion of the form without breaking the same or gaining access to its interior. This, as all drapers and window dressers have experienced, is often the source of trouble and inconvenience in arranging a gown on a model or form, inasmuch as the arm, or arms, interfere with the proper or desired arrangement of the garment.

The object of my invention is the provision of a ball and socket joint, in the use of which the arms, when desired, may be entirely removed from the body portion of the form, so that the gown may be properly placed thereon and afterward the arm secured in the desired position.

In carrying out my invention, together with the members of the ball and socket joint proper, I employ a rod pivotally connected, preferably to the ball member of the joint, and devices, preferably associated with the socket member of the joint, caused to co-act with the said rod and normally hold the ball in position in its socket but which may be turned to a predetermined position, in which the ball member is entirely separable from the socket member. Normally, these parts are held in position frictionally, and the construction of my improved joint is such that the member, to which the arm is attached, may be moved to a predetermined position, in which the frictional contact is removed or broken, and thereafter the arm and ball member of the joint must be moved to another predetermined position before the parts are entirely separable, as will be hereinafter more particularly described.

In the drawing, Figure 1 is a sectional elevation of a ball and socket joint embodying my present invention. Fig. 2 is a front elevation of the socket joint with the ball and socket member removed. Fig. 3 is a view similar to Fig. 1 showing the devices associated with the socket member in a position opposite that shown in Fig. 1.

Referring to the drawing, 10 indicates a portion of the body of a model, figure, or other similar artificial form, and 11 the upper portion of an arm. The ball 12 is secured to or made integral with one end of the arm 11, and in a suitable recess provided therefor the body portion is fitted with a socket member 13, although, as will be understood, this socket member may be entirely dispensed with and the body portion 10 of the form recessed in such a manner that a portion of the ball 12 will engage therewith, in the same manner as it engages with the socket member 13, as illustrated in the drawing.

The flattened end 14 of a rod 15 extends into a slot in the ball member 12, and at its extremity is pivotally connected therein centrally of the ball member by a bolt 16, or otherwise. This rod 15 extends centrally through the socket member 13, and also into and through a casing set in a recess provided therefor in the body member 10 at the rear of the socket member 13. This casing is preferably made of metal and comprises a cylindrical body 17, enlarged at one end and fitted with a cap 18, which, as indicated turns down on the screw threaded exterior of the enlarged portion 19 of the body of the casing, although, as will be understood, these parts may be secured together in any desired manner.

Within the enlarged portion of the casing, I employ a metal washer 20 lying adjacent the inner surface of the cap 18, a leather washer 21, and also a metal washer 22, the leather washer lying intermediate of the metal washers.

Within the body member 17 of the casing is a spring 23. This extends between the head of the casing and the adjacent surface of the metal washer 22 and normally maintains this washer, together with the leather washer 21, in such position that the leather washer bears forcibly against the metal washer 20, and the latter against the inner surface of the cap, and the tension depends upon the extent to which the cap is turned down on the casing.

In the head 25 of the body portion 17, there is a central opening and a slot 24. The cap 18 and the metal washer, as well as the leather washer 21 and the metal washer 22, are also provided centrally with apertures adapted to receive the rod 15, and in suitable positions the cap 18 and the metal washer 20 are provided with slots indicated, respectively, at 26 and 27, and the said casing and associated parts may be secured in position on the body member 10 by a set screw 28, or in any desired manner.

The free end of the rod 15 is preferably of reduced diameter, as indicated at 29 in the drawing, and adjacent its extremity is provided with a transverse pin 30 extending an appreciable distance from its surface. Also in required position therein, the rod 15 is provided with a lock pin 31, which is secured in position therein transversely thereof. Interiorly the casing is fitted with a stop pin 32, extending into slots provided therefor in the washers 21 and 22 to prevent the same from turning within the casing.

In the operation of the hereinbefore described device, the rod 15 is passed through the socket member 13 in such a manner that the pin 30 passes through the cap 18 and the washer 20, 21, and 22, until the pin 30 contacts with the inner surface of the head 25, whereupon the rod, together with the arm and ball must be turned to the position in which the pin 30 will pass through the slot 24. When so connected, as will be understood, the arm, ball and rod are free to turn, and cannot be removed from the body portion of the form unless the rod is so placed that the pin 30 will pass in the opposite direction through the slot 24.

It will also be apparent that by swinging the arm and ball to the proper position in so turn the rod as to bring the lock pin in alinement with the slots 26 and 27, and the cap 18 and washer 20, the rod may be moved farther inwardly, bringing the ball into proper position in its socket and at the same time causing the lock pin 31 to lie within the slot 27 in the metal washer 22. By then turning the rod through the arm and ball, the parts will be maintained in any desired position by the contact between the lock pin and the washer 20, and the friction between the washers 20 and 21, caused by the action of the spring 23. In the action the washer 20 is turned between the cap 18 and the leather washer 21, and the parts cannot be separated until the rod is turned to that position in which the slot in the washer 20 registers with the slot in the cap 18. Obviously, also, the manner of removing the arm and the ball member of the joint is the reverse of that hereinbefore described in regard to inserting the same.

It will furthermore be understood that inasmuch as the pins 30 and 31 extend radially from the rod 15 in approximately 90° positions, and furthermore from the fact that the washer 20 must be so moved as to bring the lock pin 31 into alinement with the slot 26 in the cap 18, in order that the lock pin may be moved through this slot, the parts of my improved joint may be thus partially separated, but cannot be entirely removed, the one from the other, when the lock pin 31 has been passed through the slot 26 until the rod 15 has been turned to the position in which the pin 30 will register with and pass through the slot 24 in the head 25. This makes it impossible for the parts to become entirely separated from one another through accident or mistake.

I claim as my invention—

1. In a ball and socket joint, a ball member, a socket member, a rod pivotally connected to one member, a pin secured in and extending transversely from said rod, a casing associated with the other member, said casing having an opening to receive said rod and a slot communicating with the said opening to receive the said pin, and a friction member movably mounted in said casing, said friction member also having a slot in which said pin is adapted to lie and in which it is locked when the slot in the casing and the slot in the friction member are not in alinement.

2. In a ball and socket joint, a ball member, a rod pivotally connected thereto, a pin secured in and extending transversely from said rod, a socket member, a casing associated therewith, the said casing having an opening to receive said rod and a slot communicating with said opening to receive said pin, a friction member movably mounted in said casing, the said friction member also having an opening to receive said rod, and a slot communicating with the opening in the friction member to receive said pin and within which the pin is adapted to lie and is locked when the slot in the casing and the slot in the friction member are not in alinement.

3. In a ball and socket joint, a ball member, a rod pivotally connected thereto, a pin secured in and extending transversely from said rod, a socket member, a casing associated therewith, a cap removably connected to said casing and having an opening to receive said rod and a slot communicating with the opening to receive said pin, and a friction member movably mounted in said casing, the said friction member also having an opening to receive said rod and a slot communicating therewith and adapted to receive said pin and within which the pin is locked when the slot in the casing and the slot in the cap are not in alinement.

4. In a ball and socket joint, a ball member, a rod pivotally connected thereto, a pin secured to and extending transversely from the said rod, a socket member, a casing associated therewith, a cap removably connected to said casing and forming one head thereof, the said cap being provided with an opening to receive said rod and a slot communicating with the opening to receive the said pin, a friction disk within said casing and bearing against the said cap, a friction washer also within the casing and bearing against the friction disk, the said friction disk being provided with an opening to receive said rod and with a slot communicating with its opening to receive the said pin, which is adapted to lie therein and to be locked in position when the slot in the casing and the slot in the friction disk are not in alinement, means for yieldingly maintaining said friction disk and friction washer in contact with each other and with said cap, and means for varying the tension at which said friction disk and friction washer are held against each other and against said cap.

5. In a ball and socket joint, a ball member, a rod pivotally connected thereto, a lock pin secured in and extending transversely from the said rod, a socket member, a casing associated therewith, a cap having an opening therein to receive the said rod and slot to receive the said lock pin, a washer within the casing having a slot to receive the said lock pin, a second washer within the casing of relatively yielding material, and a spring for normally maintaining the washers in frictional engagement to maintain the said rod and ball member in operative relationship to the socket member.

6. In a ball and socket joint, a ball member, a rod pivotally connected thereto, a lock pin secured in and extending transversely from the said rod, a socket member, a casing associated therewith, a cap having an opening therein to receive the said rod and a slot to receive the said lock pin when said ball member and rod are in a predetermined position, a washer within the casing having a slot to receive the said lock pin, a second washer within the casing of relatively yielding material, a spring for normally maintaining the washers in frictional engagement to maintain the said rod and ball member in operative relationship to the socket member, and means whereby the ball member and rod are entirely separable from the socket member when in a second predetermined position relative thereto.

7. In a ball and socket joint, a ball member, a rod pivotally connected thereto, a lock pin secured in and extending transversely from the said rod, a socket member, a casing associated therewith, a cap having an opening therein to receive the said rod and a slot to receive the said lock pin, a washer within the casing having a slot to receive the said lock pin, a second washer within the casing of relatively yielding material, a spring for normally maintaining the washers in frictional engagement to maintain the said rod and ball member in operative relationship to the socket member, the said rod at its free end being of reduced diameter and adapted to pass through an opening provided therefor in the head of the said casing, and a pin fixed in and extending transversely from the reduced end of the said rod in a position at an angle to the said lock pin, the head of the said casing being provided with a slot through which the said pin passes in order to completely remove the ball member and rod from the socket member and the said parts associated therewith.

Signed by me this 26th day of January, 1915.

JOSEPH F. HELLER.

Witnesses:
BERTHA M. ALLEN,
J. B. LE BLANC.

Copies of this patent may be obtained for five cents each, by addressing the "Commissioner of Patents, Washington, D. C."